(12) United States Patent
Papke

(10) Patent No.: US 6,726,837 B2
(45) Date of Patent: Apr. 27, 2004

(54) PORTABLE BILGE WATER FILTER APPARATUS

(76) Inventor: Rolf M. Papke, 332 Mantoloking Rd., Brick, NJ (US) 08723

(*) Notice: Subject to any disclaimer, the term of this patent is extended or adjusted under 35 U.S.C. 154(b) by 47 days.

(21) Appl. No.: 10/216,628

(22) Filed: Aug. 12, 2002

(65) Prior Publication Data

US 2004/0026308 A1 Feb. 12, 2004

(51) Int. Cl.[7] .............................. C02F 1/40; E02B 15/04
(52) U.S. Cl. .................... 210/112; 210/241; 210/242.4; 210/266; 210/299; 210/317
(58) Field of Search ...................... 210/97, 266, 924, 210/300, 301, 538, 170, 241, 242.3, 242.4, 172, 299, 311, 317, 287, 288, 109, 112, 114; 137/123–153

(56) References Cited

U.S. PATENT DOCUMENTS

| | | | | | |
|---|---|---|---|---|---|
| 1,038,417 A | * | 9/1912 | Mullennix | ................... | 210/311 |
| 1,861,481 A | * | 6/1932 | Rabjohn | ..................... | 210/317 |
| 3,957,641 A | * | 5/1976 | Jakubek et al. | ............. | 210/120 |
| 4,120,793 A | * | 10/1978 | Strain | .......................... | 210/175 |
| 5,181,802 A | * | 1/1993 | Thengs et al. | ................. | 405/70 |
| 6,004,470 A | * | 12/1999 | Abril | ........................... | 210/776 |
| 6,398,966 B1 | * | 6/2002 | Smith et al. | ................. | 210/691 |
| 6,645,387 B2 | * | 11/2003 | Naski et al. | ................. | 210/744 |
| 6,652,750 B1 | * | 11/2003 | Pica et al. | | |

FOREIGN PATENT DOCUMENTS

| | | | | | |
|---|---|---|---|---|---|
| GB | | 1508224 A | * | 4/1978 | ........... B01D/17/04 |
| JP | | 10128322 A | * | 5/1998 | ............. C02F/1/40 |

* cited by examiner

Primary Examiner—Joseph Drodge
Assistant Examiner—Terry K. Cecil
(74) Attorney, Agent, or Firm—Charles I. Brodsky

(57) ABSTRACT

A casing having an inlet positioned below the bilge water discharge outlet of a boat or ship aligns a generally U-configured pipe vertically, in which first and second open ends of the pipe are overlaid with one of a gravel or charcoal coarse material restrictive to the flow of oil-based contaminants, and with the second open pipe end coupled to the casing outlet, such that with a plurality of filter pads floating atop the overlying layer adapted to absorb oil-based contaminants, a continuous absorption of the contaminants occur as the bilge water circulates through the casing and is allowed to dwell therein while the filter pads absorb the oil-based contaminants floating atop the inputted bilge water, along with one or more wheels extending downwardly from the casing and a handle extending rearwardly of it in allowing the casing to be moved about by a user.

18 Claims, 7 Drawing Sheets

PORTABLE BILGE WATER FILTER APPARATUS

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the removal of oil-based contaminants from bilge water being discharged from a boat or ship, in general, and to a new and improved bilge water filter apparatus which is both readily serviceable and highly effective, in particular.

2. Description of the Related Art

A is well known and understood, in inboard and inboard/outboard motorized vessels, a certain amount of oil as leaks from the engine, the transmissions and the various outdrives remains in the bilge area until such time as the operator of the vessel determines to purge the accumulation. Typically, the purging is done by using a motorized bilge pump system if available, or by the simple removal of a bilge plug.

As will be appreciated, when purging the accumulation, the operator is discharging mixtures of water and oil into lakes, lagoons, bays, rivers or oceans where the craft is sailing—and if done on dry land, the discharge flows into the soil and/or into the streets. Ultimately, the discharge can lead to extensive environmental destruction—or if done on dry land, to something as simple as an oil slick on the ground which can cause a motor vehicle accident. Additionally, the discharge can lead to wildlife impairing damage, as well as significant clean-up costs where an area of contamination rises above an accepted level of pollution.

As is also well known, extensive legislation has been enacted worldwide in recent years to maintain clean waters. As a part of a dramatically increased spending program, this legislation and its accompanying regulations have been strictly applied against boaters, boat dealers, and boating service centers who might otherwise discharge oil and other petroleum-based contaminants into the water. As will be appreciated by those skilled in the art, one particular concern involves the bilge water which is periodically discharged from the hulls of boats, and which typically includes gasoline, transmission and power steering fluid, cleaning solvent and paint accumulations.

Obviously, a filtration system that secures the safety of the environment, and provides a means of effectively cleaning these waste materials inexpensively and simply is highly desirable. One approach that has been proposed to accomplish this is that described in application Ser. No. 09/680,181 entitled "Externally Mounted Bilge Water Filter and Methods Therefor", in describing the use of a disposable filter. Analysis and investigation, however, have shown that serviceable filters oftentimes are more effective than disposable filters in removing contaminants—and, over the long haul, are more economical to use in providing optimum results. Analysis and investigation have further shown, moreover, that there exists a significant need for a filtration system usable both by boating service centers and boaters themselves when dealing with the bilge water discharge on land, when such a fixed filter has not been incorporated as part of the boat manufacture. There, too, a need exists to collect the oil and other petroleum-based contaminants in preventing their soaking into the soil and requiring extensive remediation in clean-up.

OBJECTS OF INVENTION

It is an object of the present invention, therefore, to provide an enhanced bilge water filter apparatus for oil-based contaminants.

It is object of the present invention, also, to provide such apparatus which offers a high degree of contaminant removal, at a relatively inexpensive cost.

It is another object of the invention to provide such apparatus which is easily serviceable in use.

It is a further object of the invention to provide this enhanced bilge water filter apparatus so as to be usable on land, both by a boat dealer and boating service center, and by the individual weekend boater himself.

It is yet a further object of the invention to provide such apparatus which allows adaptation in a variety of different manners.

It is also an object of the invention to provide such apparatus which allows this adaptation in a variety of different sizes.

SUMMARY OF THE INVENTION

As will become clear from the following description, the apparatus of the invention relies on the molecular weight difference between water and oil by which the oil always floats on top. As will also be seen, the operation relies on the availability of filter pads which allow water to pass through quite easily, but which absorb oil-based contaminants. Following the realization that the longer the "dwell time" is of the oil on the water while in contact with the filter pads, the greater the oil-based contaminant absorption will be, the apparatus of the invention incorporates this through the utilization of a generally U-configured pipe aligned vertically within an enclosed casing.

As will become clear from the description that follows, the enclosed casing aligns the pipe in vertical orientation, with the oil-based contaminant bilge water being inputted into the casing by way of an inlet included in its top surface. A first open end of the U-configured pipe is overlaid by a layer of material restrictive to the flow of any oil-based contaminant in the bilge water, while a second open end of the pipe (also overlaid by the layer) is coupled with an outlet of the casing. A plurality of the filter pads are added atop the overlying layer, adapted to absorb the oil-based contaminants in the bilge water. With the overlying layer including a coarse gravel or charcoal mixture, for instance, the oil-based contaminants in the inputted bilge water will be prevented from flowing to the first open end of the U-configured pipe. With the bilge water inputted above the overlying layer, the oil-based contaminants thus rise as the water level in the casing rises, to then be absorbed by the filter pads floating on the water's surface. As the water level continues to dwell in the casing, more-and-more of the oil-based contaminants thus become absorbed, to the extent that a removable lid provided in the top surface of the casing in one embodiment of the invention can then be removed by a user, to simply reach in and remove and replace the filter pads as they become filled. With the second open end of the U-configured pipe coupling to the outlet downwardly below the overlying coarse material, the discharge becomes one of substantially contaminant-free water only. Testing has shown that well over 90% of the introduced oil-based contaminants can be removed in this manner. When employed at a boating service center, the casing can be provided with at least one downwardly extending wheel and with a rearwardly extending handle to allow its movement about the boat yard by a pushing on, or a pulling of, the handle. When employed by a boater, on the other hand, a much smaller unit could suffice, to the extent that the wheel(s) and handle could be eliminated, and the filter apparatus could simply be carried about. In either event, the inlet in the top surface of the casing is aligned under the bilge water outlet of the boat, whose plug is then removed and the bilge water captured by gravity flow. A clean-out could be additionally provided—at a side surface of the casing, for example—to enable a scooping-out of some of the contaminant as it floats on the rising water in the casing, and deposited in a bucket or pail.

In a preferred embodiment of the invention, the enclosed casing is selected to have a horizontal axis of length dimension greater than an included vertical axis of height dimension to facilitate the placement of the casing below the bilge water discharge outlet of the vessel. Individual ones of the plurality of filter pads are horizontally aligned in columns, vertically spaced one from another—and to further enhance the absorption provided, the filter pads may be additionally spaced one from another in one or more rows. As the oil-based contaminated bilge water rises in the casing, more and more of the filter pads will be understood to come into play in absorbing the oil-based contaminants, while allowing the substantially contaminant-free bilge Water to pass. In this embodiment, with the casing outlet included within a bottom surface, that outlet effectively receives substantially contaminant-free bilge water for discharge into the ground.

Thus, the bilge water filter apparatus of the invention will be understood to include the casing, its inlet and outlet, the overlying coarse material layer, the U-configured pipe and the absorption filter pads. Because the petroleum products, are of lesser molecular weight than that of the water, the oil contamination floats on top; and as the casing fills with the contaminated bilge water, the filtration process continues to allow sufficient dwell time for the oils and water to separate, with the filter pads absorbing the oil molecules while permitting only contaminant-free water to pass and drain from the outlet. Any oils that might still remain, continue, however, to be prevented from escaping to the casing outlet by virtue of the gravel/charcoal mixture or similar coarse material layer.

With a provided handle and wheel arrangement, the bilge water filter apparatus is portable, for pushing and pulling about a yard from boat to boat—a 20 gallon casing might then be employed, for example. For a smaller unit—2 gallons or so—, and without the handle or wheel configuration, a boater could carry the casing himself/herself to service their own vessel.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
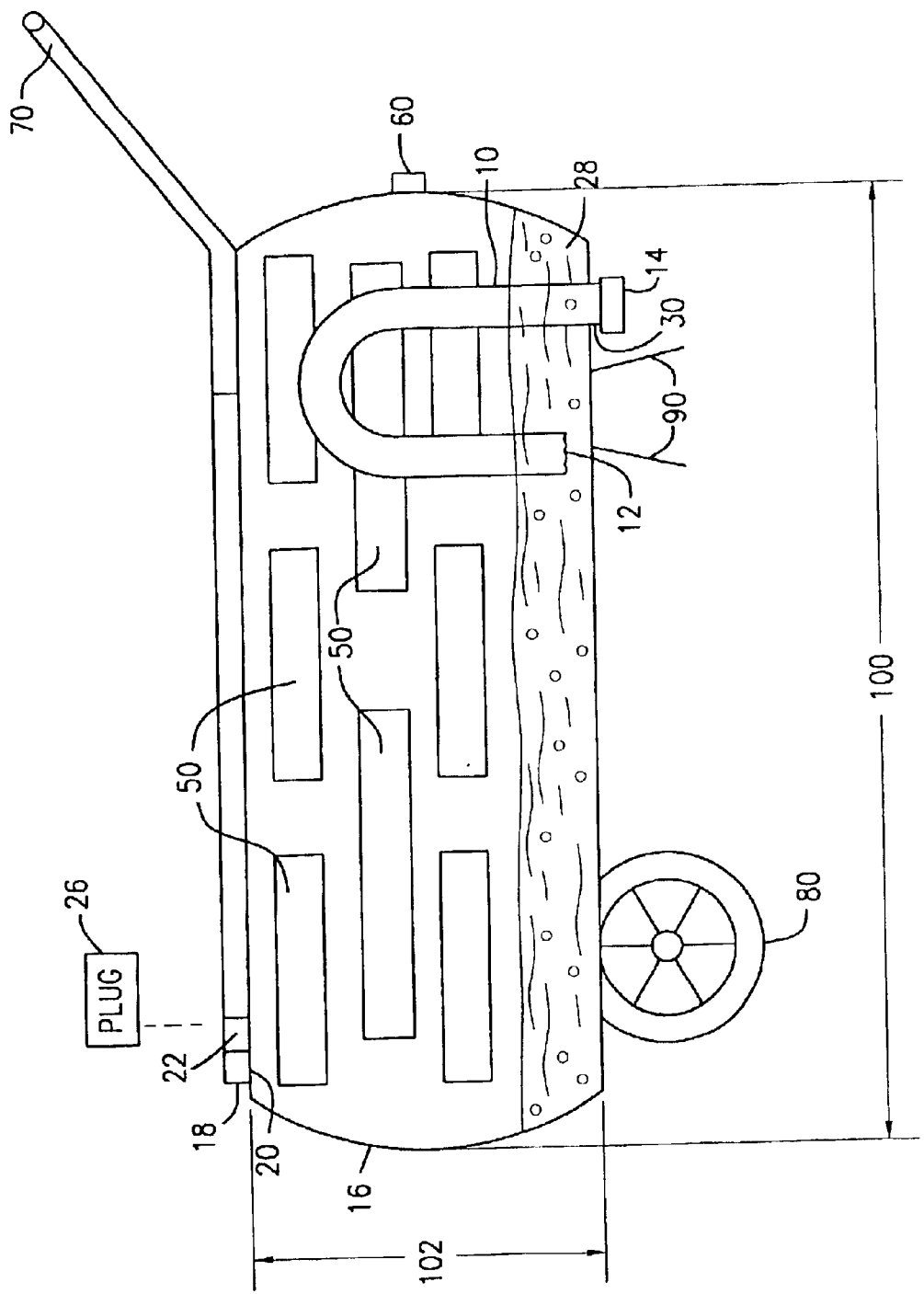
FIGS. 1–6 are cross-sectional views helpful in an understanding of the bilge water filter apparatus of the invention in several of its variants.
Figure 2:
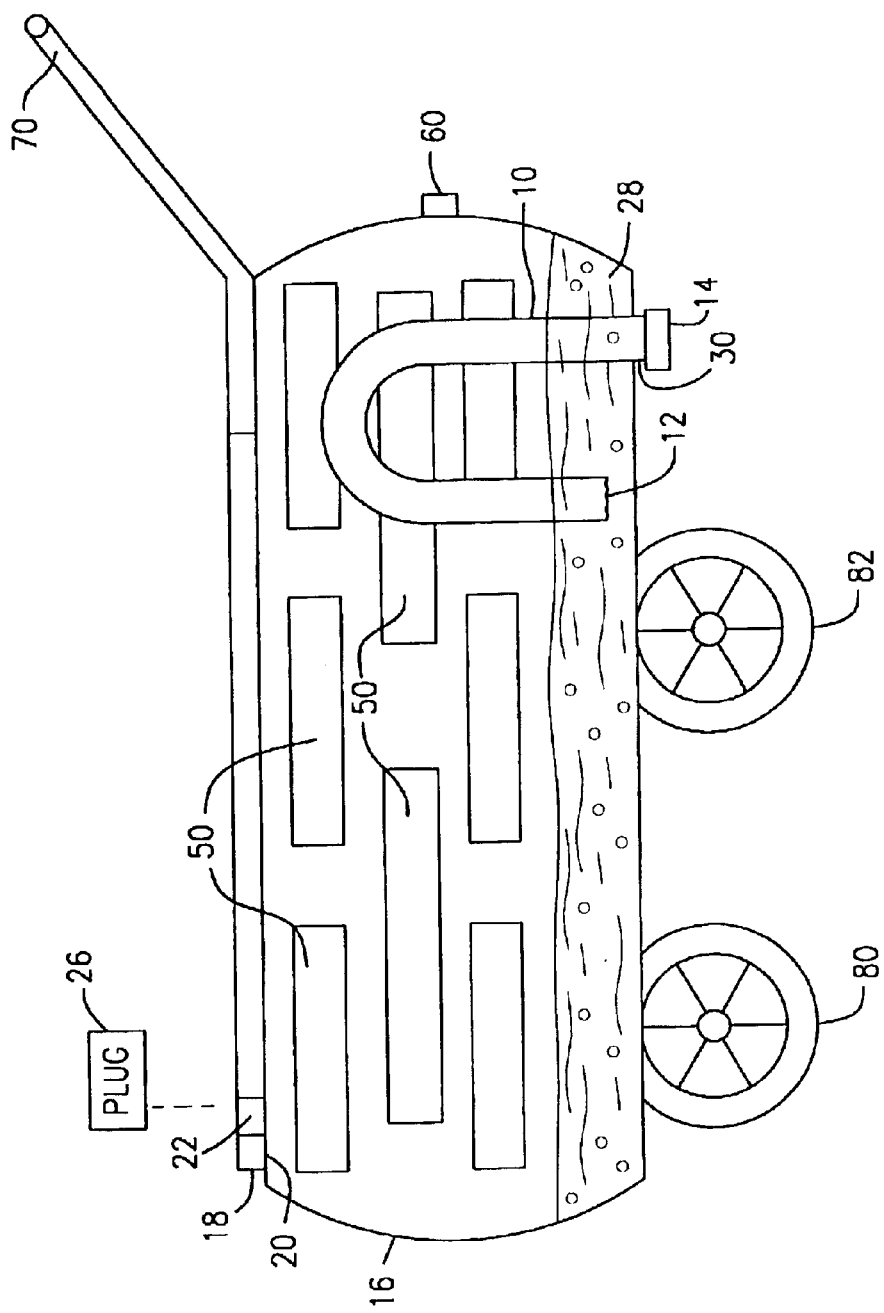
Figure 3:
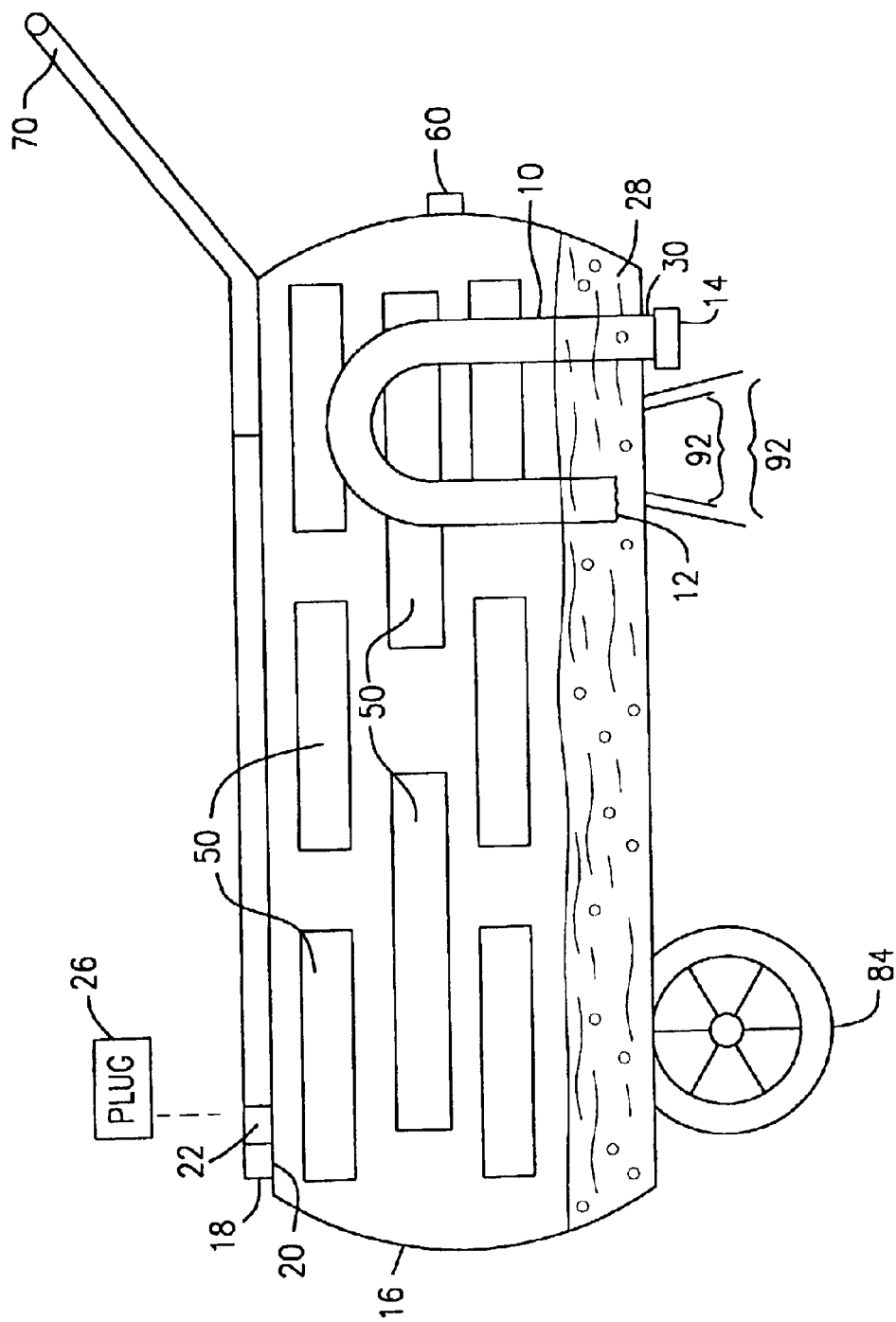

In FIGS. 1–6, the bilge water filter apparatus includes a generally U-configured pipe 10 having first and second open ends 12, 14. An enclosed casing 16 having a removable lid 18 in its top surface 20 aligns the pipe 10 in a vertical orientation, as shown. An inlet 22 in the removeable lid 18 may be aligned below the bilge water discharge outlet of a boat (shown at 26), and a layer of material 28 overlies the first open pipe end 12—being restrictive to the flow of oil-based contaminants, as, for example, when including either or both of a coarse gravel and charcoal mixture. An outlet 30 in FIG. 1—32 in FIG. 4—couples with the second open pipe end 14 in providing a discharge for the casing 16, with the end 14 also being overlaid by the material 28. A plurality of filter pads 50 initially seat atop the overlying layer 28, of a floatable nature to rise upwardly as oil-based contaminant bilge water is inputted into the casing 16 via the inlet 22 from the discharge outlet 26. Such filter pads, shown as being nine in number in FIG. 1, are horizontally spaced one from another, and adapted to absorb oil-based contaminants while allowing substantially contaminant-free water to pass therethrough. Such filter pads may be of a type manufactured by Environ Marine, under the Tradename BILGE BUOY, capable of absorbing one gallon and more of fuel and oil depending on size.

Figure 4A:
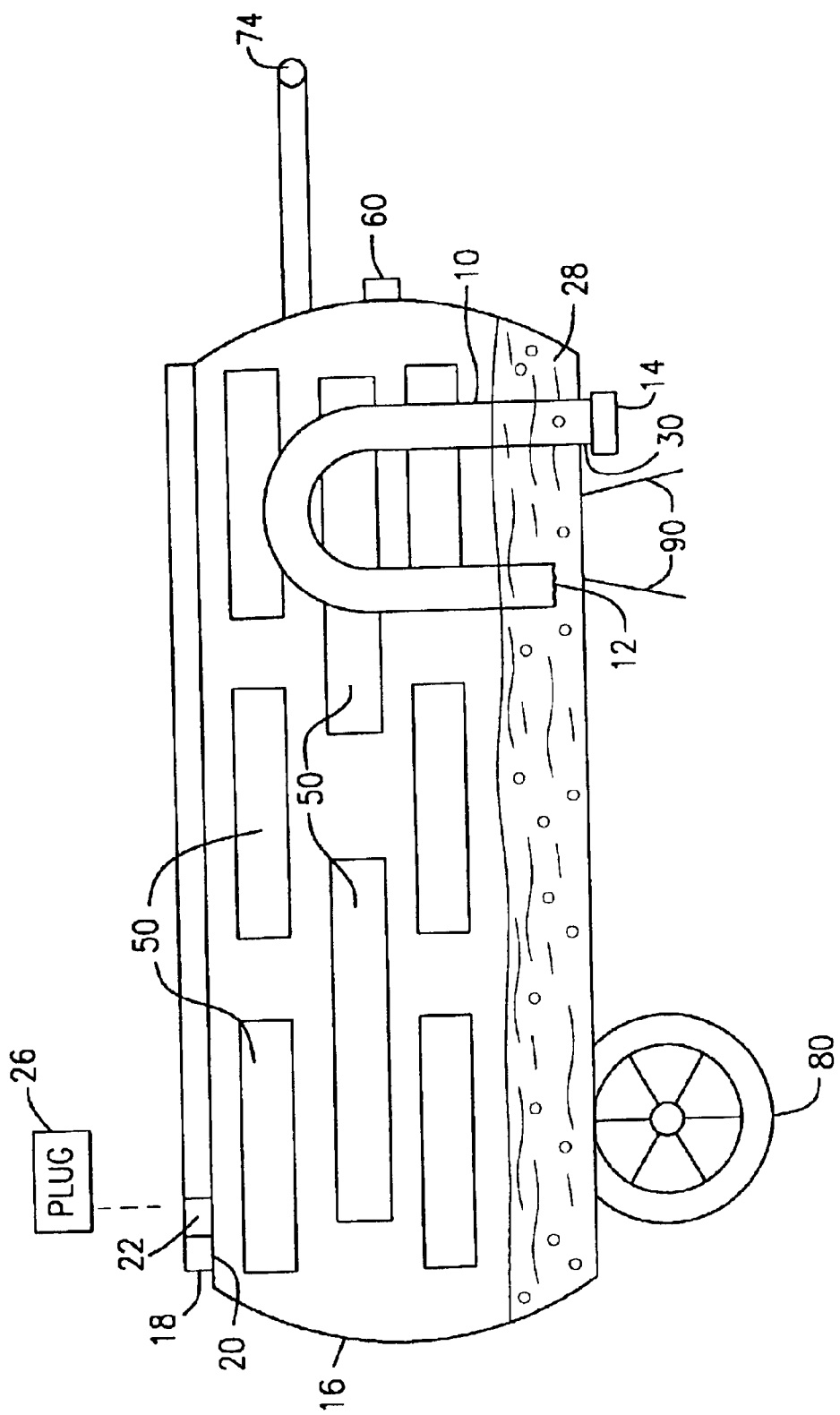
Figure 4B:
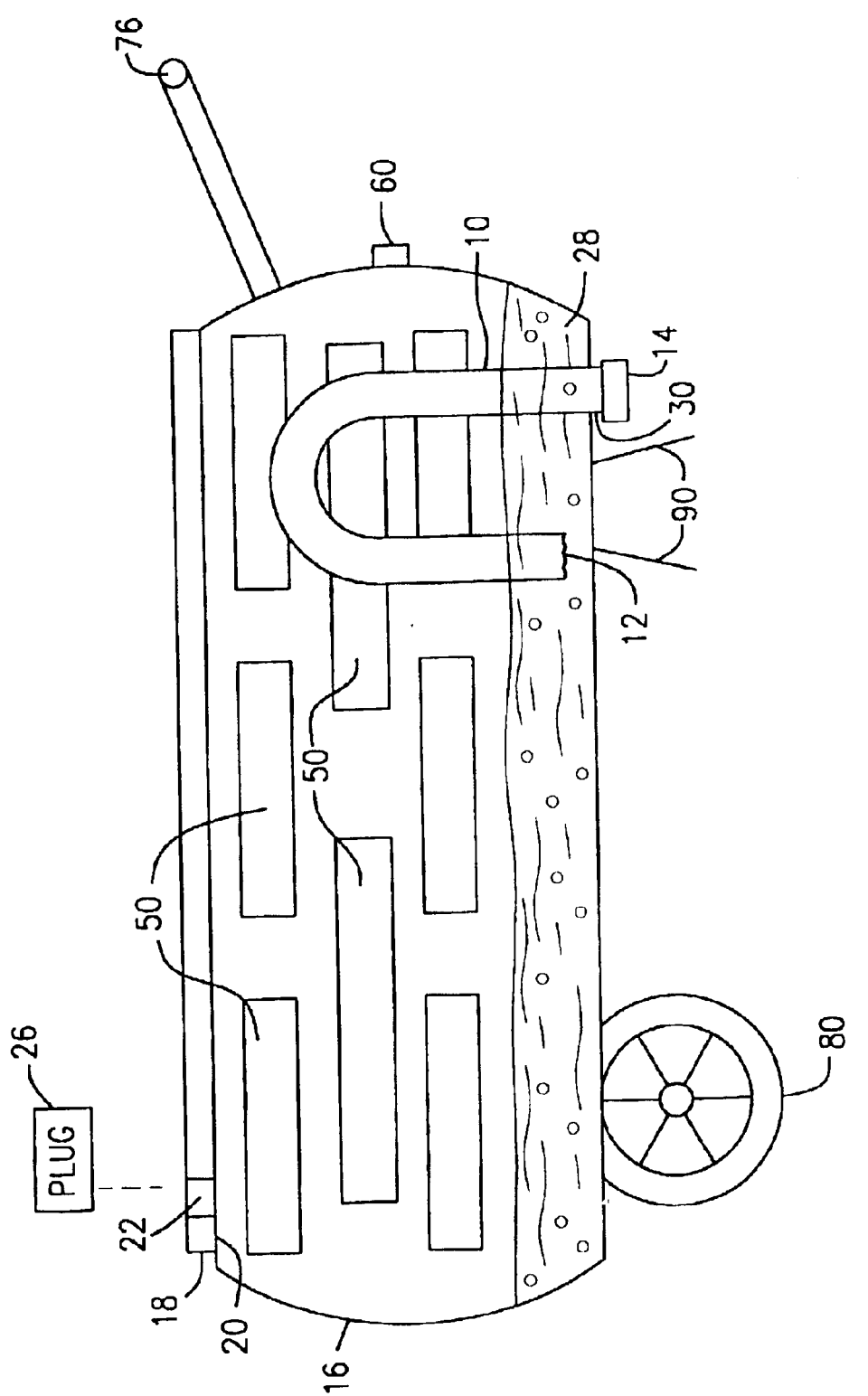
Figure 5:
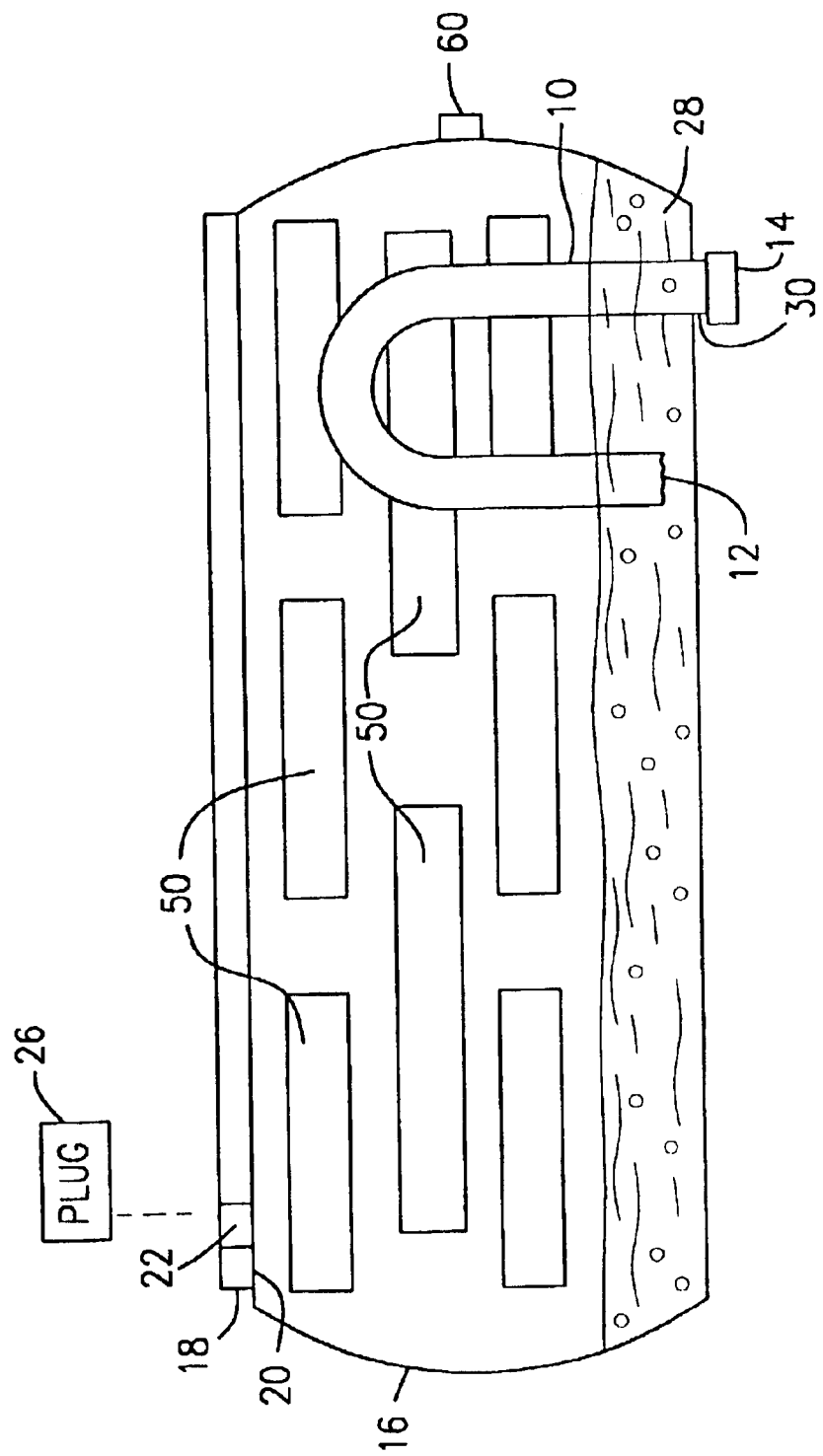
Figure 6:
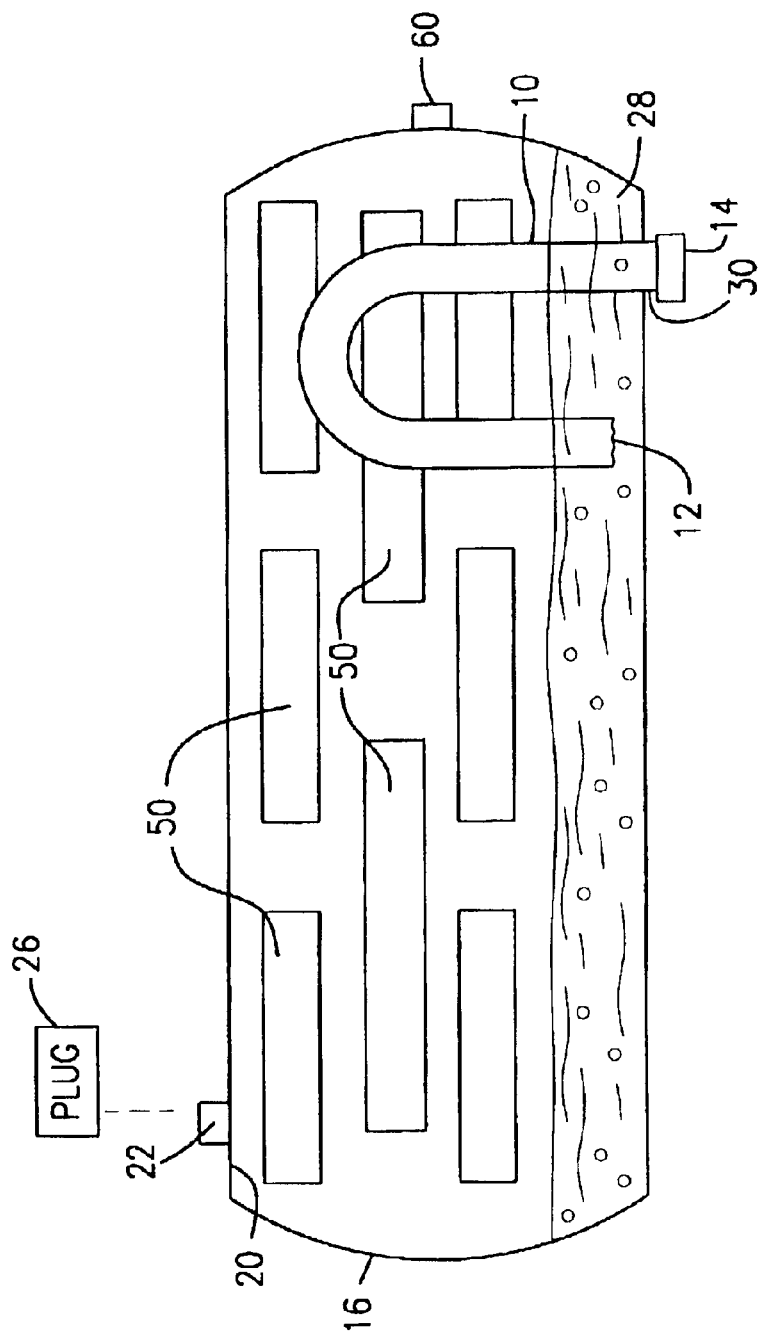

In the embodiment of the invention shown in FIG. 1 for use primarily at a boat servicing center, the removable lid 18 is provided with a handle 70 extending rearwardly of the casing 16—or, as an alternative, the handle may be coordinated with the casing itself, as at 74 or as at 76 in FIGS. 4a and 4b respectively—to extend rearwardly of the casing 16. At the same time, a pair of wheels 80 (one on either side of the casing 16) extend downwardly from it, in allowing the casing to be moved by a user by a pushing on, or a pulling of, the handle. One or more stands 90 may be coordinated with an underside of the casing 16 for resting the portable bilge water filter apparatus in place, although in the embodiment of FIG. 2, a second set of wheels 82 may be employed instead. With the further construction of FIG. 3, on the other hand, a pair of stands 92 may be employed with a single wheel 84, in much the same manner as a wheelbarrow.

Once in proper position beneath the boat, and the bilge water discharge opened, the oil contaminated bilge water enters the casing 16 by way of the inlet 22, but its oil-based contaminants are prevented by the gravel and/or charcoal mixture from entering the open pipe end 12 or from reaching the outlet 30. The oil-based contaminated molecules ride atop the rising water level in the casing 16, only to be absorbed by the filter pads 50 which float with the water level. Such absorption takes place When the water level is "high" as illustrated in FIG. 1, as well as when the water level is "low", when the filter pads 50 float near to the overlying layer 28. Activating the bilge pump in the boat then forces the substantially contaminant-free water up through the open end 12 of the U-configured pipe 10, to exit the open end 14 at the outlet 30 as a substantially contaminant-free water discharge; the oil-based contaminants are captured by the filter pads 50. After continued use, the removable lid 18 can simply be lifted off, and any and all filled pads 50 can simply be withdrawn for replacement. In addition, a clean-out port 60 can be provided to additionally scoop out the oil sludge as it rises atop the water level, for cleaning into a bucket or pail for discard.

Whereas FIG. 1 illustrates one embodiment of a bilge water filter including nine side-by-side filter pads 50, it will be understood by those skilled in the art that the precise number of filter pads, how they may be arranged in columns, how they may be arranged in one or more rows, how much spacing there is to be between them horizontally and/or vertically depends upon the size of the casing employed. For larger industrial units, obviously, a greater number might be employed, whereas if intended for the weekend boater, smaller numbers of filter pads, in different orientations would be all that is required, because of the decreased need. With either situation, though, the horizontal axis of the casing 16 is selected of a length dimension 100 greater than an included vertical axis of height dimension 102 in enabling an ease of placement of the inlet 22 below the bilge water discharge outlet of the boat being serviced. A 12 inch diameter casing of 3 foot length would probably suffice for a 20 gallon industrial filter in servicing boats propped up 2½ feet from the ground; other dimensions could be employed as well depending upon requirements. When constructed of polyvinylchloride, for example, and where the servicing is being done by a boater, the handle 70 and the wheels 80 may be eliminated, with the filter then being of little enough weight to allow it to be carried about for proper placement in servicing. As will be understood, in such a usage, the need is not as great as in industrial usage, and a fewer number of filter pads 50 than "nine" as in FIG. 1 would probably be required. Shown in FIGS. 5 and 6 without the wheels 80 and handle 70, and for the construction with the removable lid 18 and without it, respectively, two rows of differing numbers of pads are employed, as with three pads in the upper row, and two pads in the lower row. As with the configurations of FIGS. 1 and 2, the filter pads ride upwardly and downwardly with the level of bilge water in the casing, absorbing the lighter molecule oil-based petroleum products for as long as they continue to float atop the water's surface, or even if submerged below it.

Whereas the externally mounted bilge water filter of the Ser. No. 09/680,181 now U.S. Pat. No. 6,652,750. Application also includes a filter pad which absorbs oil-based contaminants in bilge water, such construction operates by absorbing oil-based contaminants as the bilge water flows downwardly through the filter pad from its top opening inlet towards its bottom discharge outlet—namely, a 1-pass removal. With the construction of the present invention, however, the oil-based contaminants continue to circulate round and round into the filter pads by the activation of the bilge pump and as the water level rises and falls, until the contaminants are absorbed from the water upon which they float. This will be seen to follow from the inclusion of the coarse overlying gravel and/or charcoal layer 28 which restricts the flow of the oil-based contaminants to the open pipe end 12 and to the outlets 30, or 32. The end result is a more complete and efficient filtering, over a longer dwell time of the bilge water within the casing; and, in a construction which allows for the removal and discarding of the filter pads when filled, instead of a discarding of the filter itself in its entirety, as envisioned by the construction of that prior disclosure. This allows for a more inexpensive manner of filtering, as well as one affording a greater degree of environmental safety and securement.

While there have been described what are considered to be preferred embodiments of the present invention, it will be readily appreciated by those skilled in the art that modifications can be made without departing from the scope of the teachings herewith. For at least such reason, therefore, resort should be had to the claims appended hereto for a true understanding of the invention.

I claim:

1. A portable bilge water filter apparatus comprising:
   a generally U-configured pipe having first and second open ends;
   a horizontal casing aligning said pipe in vertical orientation therein;
   an inlet in said casing;
   a layer of material overlying said first open pipe end restrictive to the flow of oil-based contaminants;
   an outlet in said casing coupled with said second open pipe end;
   a plurality of filter pads atop said overlying layer adapted to absorb oil-based contaminants;
   a plug in communication with a bilge water discharge outlet for inputting oil-based contaminant bilge water into said inlet;
   a handle extending rearwardly of said casing; and
   at least one wheel extending downwardly from said casing;
   whereby said casing is movable by a user by a pushing on, or a pulling of, said handle.

2. The portable bilge water filter apparatus of claim 1 wherein said overlying layer includes a coarse material allowing substantially contaminant-free bilge water to flow therethrough.

3. The portable bilge water filter apparatus of claim 2 wherein said overlying layer includes at least one of a gravel and charcoal coarse material.

4. The portable bilge water filter apparatus of claim 1 wherein said layer additionally overlies said second open pipe end.

5. The portable bilge water filter apparatus of claim 4 wherein said second open pipe end extends downwardly below said overlying layer through said outlet.

6. The portable bilge water filter apparatus of claim 4 wherein said second open pipe end extends sideways across said overlying layer through said outlet.

7. The portable bilge water filter apparatus of claim 1 wherein individual ones of said plurality of filter pads are floatable.

8. The portable bilge water filter apparatus of claim 7 wherein said individual ones of said plurality of filter pads are horizontally aligned in columns vertically spaced one from another.

9. The portable bilge water filter apparatus of claim 7 wherein said plurality of filter pads are horizontally aligned in columns vertically spaced one from another in one or more rows.

10. The portable bilge water filter apparatus of claim 1 wherein said casing includes a horizontal axis of length dimension greater than an included vertical axis of height dimension.

11. The portable bilge water filter apparatus of claim 1 wherein said inlet is included within a top surface of said casing.

12. The portable bilge water filter apparatus of claim 11 wherein said outlet is included within a bottom surface of said casing.

13. The portable bilge water filter apparatus of claim 11 wherein said top surface includes a removable lid.

14. The portable bilge water filter apparatus of claim 1 wherein said inlet is adapted for coupling with a bilge water discharge outlet of a boat.

15. A portable bilge water filter apparatus comprising:
    a generally U-configured pipe having first and second open ends;

a horizontally aligned casing orienting said pipe in vertical position therein;

an inlet in a top surface of said casing;

a layer of material overlying said first open pipe end restrictive to the flow of oil-based contaminants;

an outlet in a bottom surface of said casing coupled with said second open pipe end;

a plurality of filter pads vertically spaced one from another atop said overlying layer adapted to absorb oil-based contaminants;

a plug in communication with a bilge water discharge outlet for inputting oil-based contaminant bilge water into said inlet;

a handle extending rearwardly of said casing;

and at least one wheel extending downwardly from said bottom surface of said casing;

whereby said casing is movable forwardly and rearwardly by a user by a pushing on, and a pulling of said handle respectively.

16. The portable bilge water filter apparatus of claim 15 wherein said plurality of filter pads are horizontally aligned in columns vertically spaced one from another in one or more rows.

17. A portable bilge water filter apparatus comprising:

a generally U-configured pipe having first and second open ends;

a horizontally aligned casing orienting said pipe in vertical position therein;

an inlet in a top surface of said casing;

a layer of material overlying said first open pipe end restrictive to the flow of oil-based contaminants;

an outlet in a bottom surface of said casing coupled with said second open pipe end;

a plurality of filter pads vertically spaced one from another atop said overlying layer adapted to absorb oil-based contaminants;

a plug in communication with a bilge water discharge outlet for inputting oil-based contaminant bilge water into said inlet and wheeled means configured such that said casing is moveable forwardly and rearwardly by a user applying a pushing or pulling force thereto.

18. The portable bilge water filter apparatus of claim 17 wherein said plurality of filter pads are horizontally aligned in columns vertically spaced one from another in one or more rows.

* * * * *